United States Patent
Bass et al.

(10) Patent No.: US 7,484,052 B2
(45) Date of Patent: Jan. 27, 2009

(54) DISTRIBUTED ADDRESS ARBITRATION SCHEME FOR SYMMETRICAL MULTIPROCESSOR SYSTEM

(75) Inventors: Brian M. Bass, Apex, NC (US); Thomas L. Jeremiah, Hillsborough, NC (US); Charles R. Johns, Austin, TX (US); David J. Shippy, Austin, TX (US); Thuong Q. Truong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 11/120,909

(22) Filed: May 3, 2005

(65) Prior Publication Data

US 2006/0253661 A1    Nov. 9, 2006

(51) Int. Cl.
*G06F 12/00* (2006.01)
(52) U.S. Cl. ....................................... 711/154
(58) Field of Classification Search .................. 711/154
See application file for complete search history.

(56) References Cited

U.S. PATENT DOCUMENTS

| | | | |
|---|---|---|---|
| 4,760,521 A | 7/1988 | Rehwald et al. | 365/200 |
| 5,581,713 A | 12/1996 | Myers et al. | 395/299 |
| 5,682,512 A * | 10/1997 | Tetrick | 711/202 |
| 5,734,926 A | 3/1998 | Freeley et al. | 395/848 |
| 5,781,757 A | 7/1998 | Deshpande | 395/473 |
| 6,247,100 B1 | 6/2001 | Drehmel et al. | 711/141 |
| 6,513,084 B1 | 1/2003 | Berkowitz et al. | 710/242 |
| 6,591,307 B1 * | 7/2003 | Arimilli et al. | 713/375 |
| 7,072,904 B2 * | 7/2006 | Najork et al. | 707/103 R |
| 7,210,019 B2 * | 4/2007 | Corrado | 711/208 |
| 2002/0129211 A1 | 9/2002 | Arimilli et al. | 711/146 |
| 2004/0064463 A1 * | 4/2004 | Rao et al. | 707/100 |
| 2004/0230751 A1 * | 11/2004 | Blake et al. | 711/147 |

* cited by examiner

*Primary Examiner*—Matt Kim
*Assistant Examiner*—Ryan Dare
(74) *Attorney, Agent, or Firm*—Joscelyn G. Cockburn; James A. Lucas; Driggs, Hogg, Daugherty & Del Zoppo Co., LPA

(57) ABSTRACT

The present invention utilizes the good qualities of a single address concentrator (AC), without any extra chips or wires, and distributes the AC function among the various chips, making use of the fact that each chip in the system has a copy of the AC function therein. Using the distributed address concentrator function, each chip will handle approximately one-fourth of the command traffic and the average latency of servicing the commands will be approximately the same across each chip in the system.

10 Claims, 2 Drawing Sheets

DISTRIBUTED ADDRESS ARBITRATION SCHEME FOR SYMMETRICAL MULTIPROCESSOR SYSTEM

FIELD OF THE INVENTION

The present invention relates generally to a symmetrical multiprocessor system and, more particularly, to the address arbitration scheme used across multiple chips in the system.

RELATED APPLICATION

This application is related to application Ser. No. 11/121,121, filed May 5, 2005, for Retry Cancellation Mechanism to Enhance System Performance, which is incorporated by reference herein.

BACKGROUND OF THE INVENTION

In a symmetrical multiprocessing system, there are three main components: the processing units with their cache; the input/output (I/O) devices with their direct memory access (DMA) engines; and the distributed system memory. The processing units execute instructions. The I/O devices handle the physical transmission of data to and from memory using the DMA engine. The processing units also control the I/O devices by issuing commands from an instruction stream. The distributed system memory stores data for use by these other components. As the number of processing units and system memory size increases, the processing systems need to be housed in separate chips.

The separate chips need to be able to communicate with each other in order to transfer data between all the components in the system. Also, in order to keep the processing unit's caches coherent, each device in the system needs to see each command issued. The processing unit's caches keep copies of data from system memory in order to allow the processing unit fast access to the data. The coherent architecture allows caches to have shared copies of data (data is unmodified and the same as in system memory), or exclusive copies of data so the processing unit can update the data (the data in the cache is the most up to date version). In order to keep each of the processing unit's caches valid, each command in the system has to be seen by each device so out of date copies of data can be invalidated and not used for future processing. Eventually, the modified copy of data will be written back to system memory and the entire process can start over again.

In order to simplify the design of the various components, all commands are sent to an address concentrator which makes sure no two commands to the same address are allowed in the system at the same time. If two commands to the same address were allowed in the system at the same time, the various components would have to keep track of each address they had acknowledged and compare it against the new address to see if they were already in the middle of a transfer for that address. If they were in the middle of a transfer, they must retry the second command so it can complete after the current transfer is completed. Also, if two or more processing units were trying to get exclusive access to a cache line, they could "fight" for the ownership and reduce system performance. By having the address concentrator ensure no two commands to the same address are active at the same time, the logic needed in each system component is reduced.

Current systems implement the address concentrator as either a separate chip in the system, as seen in FIG. 1, or as a component in one of the chips, as seen in FIG. 2. Each approach has its advantages and disadvantages.

The separate chip case of FIG. 1 has the advantages that each processing chip in the system has direct access to the address concentrator (AC) and the amount of time to get to the AC is consistent from each chip. The disadvantages of the separate chip are the added cost of the extra chip in the system and the added pins on each processing chip to access the AC chip. Also, the single AC must be able to keep up with four chips' worth of commands, so the processing speed requirements of the AC chip are increased.

In FIG. 1, the system includes four chips 10a, 10b, 10c, and 10d, each of which contains one or more processors 12. In this configuration, a separate chip 14 is provided which performs the AC function. The separate chip 14 is connected to each of the chips 10a-10d using unique data wires, and command information flows between the chip 14 and the chips 10a-10d as shown diagrammatically. When a new command is issued, the processor chip will forward the command to the AC chip 14 and this chip will perform the address concentration function for the system. When the AC function determines it is time for the command to be sent, it will forward the command to each chip 10a-10d and each will send this command to all the internal units. Each unit will respond to the command, and the partial responses will be sent back to the AC chip 14. This AC chip will then combine all partial responses, build a combined response and send this to each of the four chips 10a-10d. Once each unit on each chip has seen the combined response, the data can be moved from the source to the destination and all cache states can be updated. All commands must flow through AC chip 14 and, therefore, the AC chip has to be designed to keep up with four chips' worth of commands.

The single address concentrator in one of the processing chip's case of FIG. 2 has the advantages of reduced system cost because no separate chip is needed, nor any additional pins (the access to the AC is using existing connections between chips). The disadvantages of the single AC is the burden of keeping pace with four command streams and the added processing speed needed. Also, the delay to the AC varies with each chip in the system. P0 has direct access to the AC, but P1 is one chip hop away. P2 is two chip hops away. Each chip hop can take several clocks to complete the transfer. Therefore, depending on where the AC is located and where the commands are originating, the time to service the commands is not consistent and varies across the system.

In FIG. 2, the system includes four chips 10a, 10b, 10c, and 10d. Each chip contains one or more processors 12. Chip 10a also contains a logic block constituting the address concentrator function for the system 14a. The four chips are connected in a ring fashion and both command and data travel on the ring buses. In this example, chip 10b sends the command 20 to the AC function in chip 10a. When the AC function determines the command can be sent to the system, it will send a reflected command to each chip. This is accomplished by sending the reflected command 22 to chip 10b, which will send it to each of its internal units and also forward the reflected command 22 to chip 10c. Chip 10c will do likewise, by sending the reflected command to all its internal units and also forwarding the reflected command 22 to chip 10d. Chip 10d will send the reflected command to all its internal units, but will not need to forward the reflected command to chip 10a because this is where it was started. Each chip will gather its partial response 24 and forward it to chip 10a. The AC function in chip 10a will build the combined response 26 and send it to each chip in the system. When all units on each chip have seen the combined response, the data source can send the data to the destination and all cache states can be updated. Again, all commands must flow through this AC function in chip 10a and it must be able to keep up with four chips' worth of commands. Also, depending on where the command originates, the latency to resolve the command varies because of the time it takes to get the command to the AC function in chip 10a.

SUMMARY OF THE INVENTION

The present invention utilizes the good qualities of a single address concentrator (AC), without any extra chips or wires, and distributes the AC function among the various chips, making use of the fact that each chip in the system has a copy of the AC function therein. Using the distributed address concentrator function, each chip will handle approximately one-fourth of the command traffic and the average latency of servicing the commands will be approximately the same across each chip in the system.

DETAILED DESCRIPTION OF THE PREFERRED EMBODIMENT(S)

Figure 2:
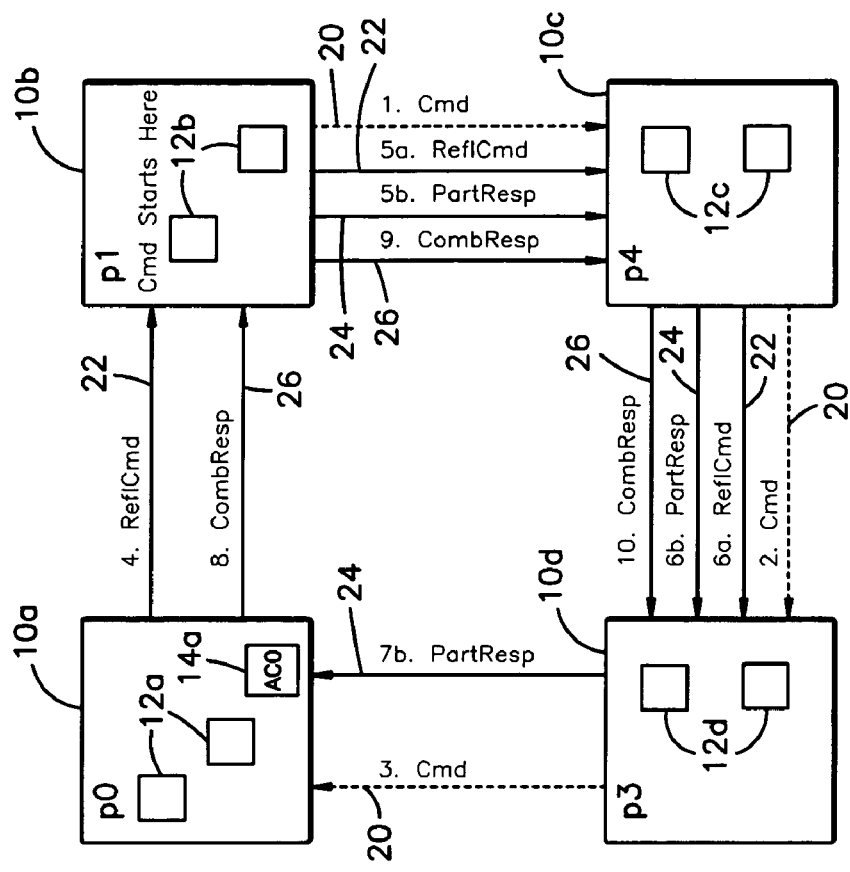
FIG. 2 is a high level block diagram of another prior art multimode coherent architecture system for performing AC functions.
Figure 1:
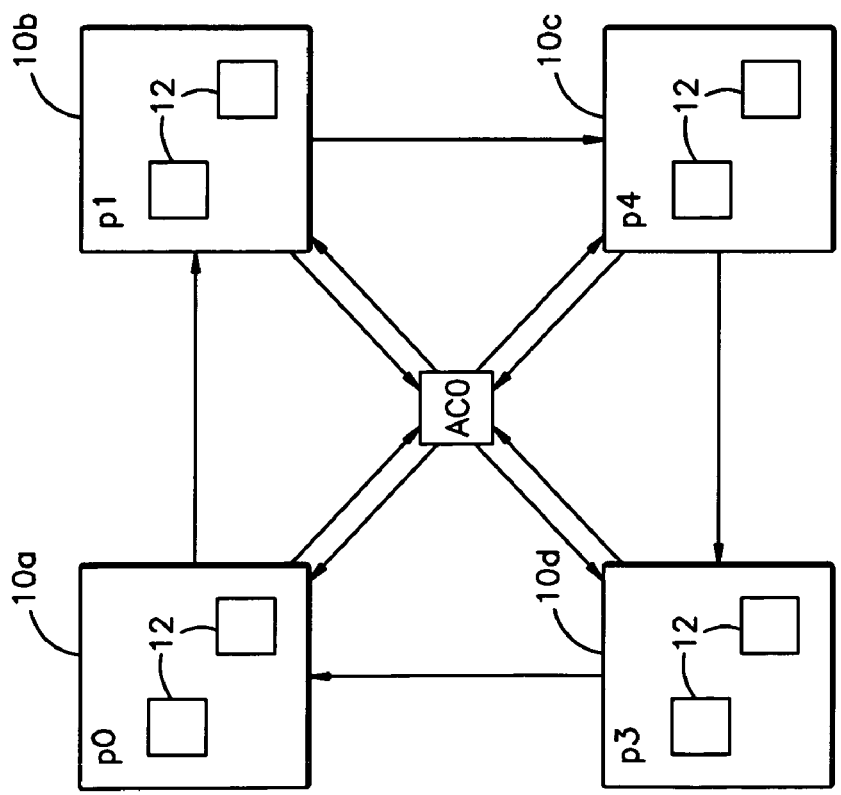
FIG. 1 is a high level block diagram of one prior art technique of performing address concentration functions in a multimode coherent architecture system.
Figure 3:
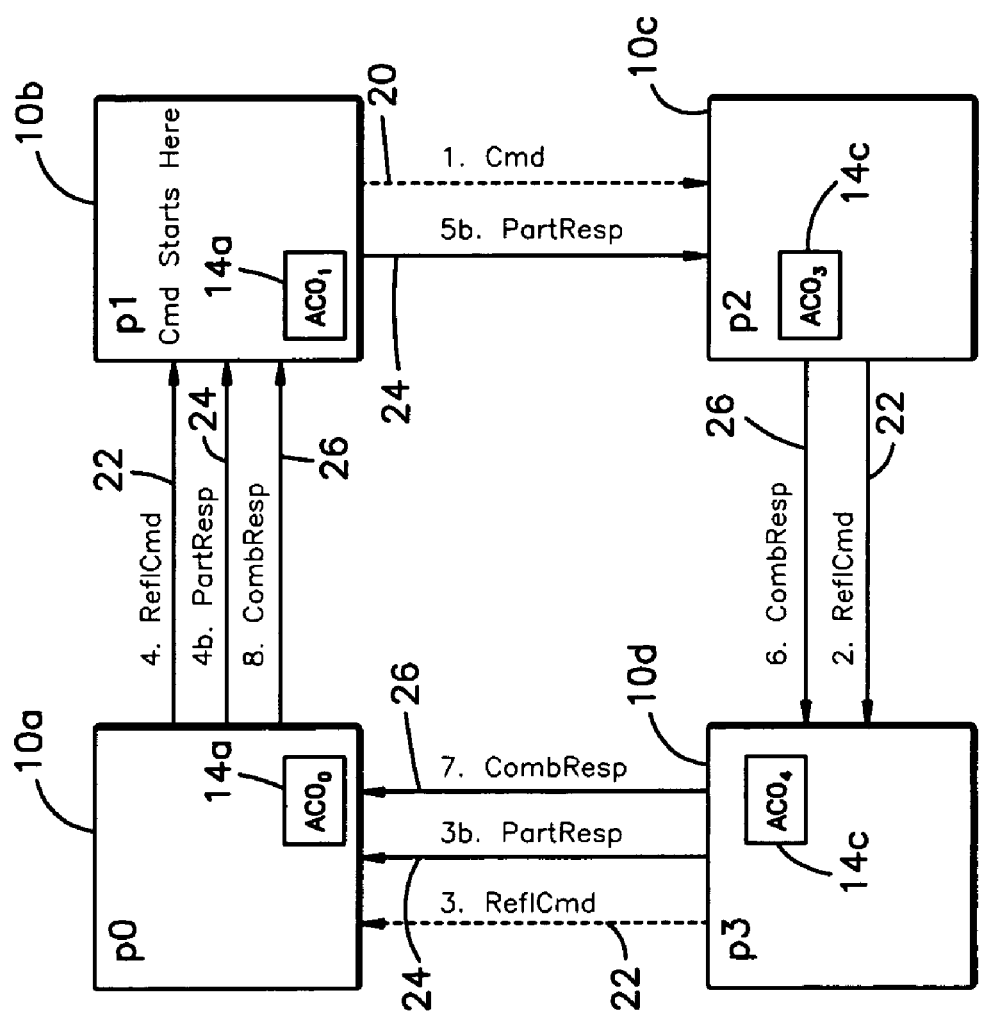
FIG. 3 is a high level block diagram of a multifunctional coherent architecture system according to this invention and its functioning.

Referring now to FIG. 3, a high level block diagram representation of the present invention is shown. This is similar to FIG. 2, except that each chip 10a, 10b, 10c, and 10d is assigned an address range and is programmed to perform the address concentrator function for that address range. Thus, the AC function is distributed among each of the chips as logic blocks 14a, rather than, as in the prior art, being concentrated in a single chip. It is preferred that each chip perform the AC function for the system memory address range of the particular chip on which the AC function resides, but it is not necessary that the AC function be coextensive with the system memory address range on the chip.

In the present invention, when a processor issues a command, the local address concentrator checks to see if the address is part of its assigned address range. If so, then this chip's AC will assume the address concentrator function for this command, and forward the command to the rest of the system. If not, then the command will be forwarded to the next chip in the system and that AC function will do its address range compare. This process continues until the appropriate AC address range is found and then that AC logic will perform the address concentration function for that command.

Whichever chip assumes the address concentrator function will start the command process of sending the reflected command 22, gathering the partial responses 24, and finally building the combined response 26. After the command phase is completed, the data movement can proceed. Since each chip has one-fourth of the system addresses, then each AC logic will handle approximately one-fourth of the total address load, and the average delay of service will be consistent across the four chips.

FIG. 3 shows an example of the technique and programming that the invention of the present system uses. First, assume the requesting processor is on chip 10b and its local AC is not assigned the command's address range. It passes the command to chip 10c as indicated at 20. Chip 10c checks to see if it has been assigned the address for this command in its configuration registers. In this example, chip 10c does own this address, so it performs the AC function described above and passes a reflected command 22 to chip 10d.

Chip 10d sends this reflected command to each of its internal units and the reflected command 22 is also passed to chip 10a. Chip 10a sends the command internally and then passes the reflected command 22 to chip 10b, the originating chip. Chip 10b sends the command internally, but does not need to pass it to chip 10c because this was the AC function chip for this command. Each chip forwards their partial response 24 around the ring until it arrives at the AC function for this command chip 10c. At this point, with the addition of the input from chip 10c, all chips have contributed their partial response. Thus, the AC function on the 10c chip generates the combined response 26, which is then relayed to each chip 10d, 10a, and 10b. Now that each device in the system has seen the command and the combined response, the data movement can proceed, just as in the prior art as described above. Four like address flows can be simultaneously sent through the system with each AC function on each chip servicing approximately one-fourth of the commands in the system. Additional flags are sent with the commands to indicate which chip is the AC function for a given command, and each chip in the system understands how to forward the commands and responses for a given AC assignment.

Thus, with a proper balancing of responsibilities, the address concentrator function is distributed across the system and the desired functions are accomplished without the limitations and drawbacks of the prior art as described above.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. A method for handling address concentrator (AC) functions in a multi-processor system containing a plurality of independent nodes, wherein each node is associated with one processor in said system and includes a logic block capable of performing the address concentrator function, and each AC logic block has an address assigned to it for address concentration comprising:
    arranging the processors in a closed loop;
    assigning each node with a separate address range for data storage;
    distributing AC command traffic approximately equally among each of the nodes;
    when a processor issues a command to a node, the AC logic block at that node determines if the address range for said command is in the range assigned to that AC logic block for address concentration function;
    if yes, the AC logic block performs the AC function and, if no, the command is passed to the next node in the loop for said determination;
    the determination is made successively from one node to the next in the loop until the range of addresses for address concentration is found and the AC function performed at that node;

whichever AC logic block performs the AC function will start reflecting commands and building a combined response which is delivered sequentially to each successive node in the loop.

2. The invention as defined in claim 1 wherein the data range for data storage and the address range for address concentration at each node are coextensive with each other.

3. The invention as defined in claim 1 wherein the AC functions include combining the partial responses from each node and issuing a combined response to all nodes in the system.

4. The invention as defined in claim 1 wherein the addresses assigned to each AC logic block for address concentration function are substantially proportional to the number of nodes in the system.

5. The invention as defined in claim 1 wherein there are four nodes in the system.

6. A structure for handling address concentrator (AC) functions in a multi-processor system containing a plurality of independent nodes arranged in a closed loop, wherein each node includes a logic block capable of performing the address concentrator function, wherein each node has a separate address range assigned for data storage, and wherein each AC logic block has an address assigned to it for address concentration, comprising:

each node is associated with one processor in the system;

the AC functions include programming to distribute command traffic approximately equally among each of the nodes; and each processor includes programming such that:

when a processor issues a command to its associated node, the AC logic block at that node determines if the address range for said command is in the range assigned to that AC logic block for address concentration function;

if yes, the AC logic block performs the AC function and, if no, the command is passed to the next node in the system for said determination;

the determinations are made successively from one node to the next node in the loop until the range of addresses for address concentration is found and the AC function is performed at that node;

whichever AC logic block performs the AC function will start reflecting commands and building a combined response which is delivered sequentially to each node in the system.

7. The invention as defined in claim 6 wherein the data range for data storage and the address range for address concentration at each node are coextensive with each other.

8. The invention as defined in claim 6 wherein the AC functions include combining the partial responses from each node and issuing a combined response to all nodes in the system.

9. The invention as defined in claim 6 wherein the addresses assigned to each AC logic block for address concentration function are substantially proportional to the number of nodes in the system.

10. The invention as defined in claim 6 wherein there are four nodes in the system.

* * * * *